United States Patent
Baker et al.

(10) Patent No.: US 7,211,542 B2
(45) Date of Patent: May 1, 2007

(54) METHOD FOR PRODUCING POWDERED METAL CATALYSTS

(75) Inventors: R. Terry K. Baker, Hopkinton, MA (US); Nelly M. Rodriguez, Hopkinton, MA (US)

(73) Assignee: Catalytic Materials LLC, Pittsboro, NC (US)

( * ) Notice: Subject to any disclaimer, the term of this patent is extended or adjusted under 35 U.S.C. 154(b) by 454 days.

(21) Appl. No.: 10/755,126

(22) Filed: Jan. 9, 2004

(65) Prior Publication Data
US 2004/0142816 A1   Jul. 22, 2004

Related U.S. Application Data

(62) Division of application No. 10/015,453, filed on Dec. 11, 2001, now Pat. No. 6,849,245.

(51) Int. Cl.
*B01J 23/74* (2006.01)
(52) U.S. Cl. ............... 502/330; 502/325; 502/337; 502/338
(58) Field of Classification Search ......... 502/229, 502/230, 325, 328, 330, 337, 338
See application file for complete search history.

(56) References Cited

U.S. PATENT DOCUMENTS

| | | | |
|---|---|---|---|
| 3,867,280 A | * | 2/1975 | Paynter et al. ............ 208/139 |
| 4,663,230 A | | 5/1987 | Tennent |
| 4,828,676 A | | 5/1989 | Sawyer et al. |
| 5,149,584 A | | 9/1992 | Baker et al. |
| 5,165,909 A | | 11/1992 | Tennent et al. |
| 5,413,866 A | | 5/1995 | Baker et al. |
| 5,458,784 A | | 10/1995 | Baker et al. |
| 5,618,875 A | | 4/1997 | Baker et al. |
| 5,653,951 A | | 8/1997 | Rodriguez et al. |
| 6,159,538 A | | 12/2000 | Rodriguez et al. |

OTHER PUBLICATIONS

M. S. Dresselhaus, et al.; "Fullerenes"; Journal of Materials Research, vol. 8, No. 8; Aug. 1993; pp. 2087-2092.
Kim, et al.; "Carbon Nanofibers as a Novel Catalyst Support"; Mat. Res. Soc. Symp. Proc., vol. 368; 1995; pp. 99-104.

* cited by examiner

*Primary Examiner*—Stuart Hendrickson
(74) *Attorney, Agent, or Firm*—Henry E. Naylor; Kean, Miller, Hawthorne, D'Armond, McCowan & Jarman, LLP

(57) ABSTRACT

A method for producing high yields of high-purity carbon nanostructures having uniform average widths narrower than conventional carbon nanostructures. The nanostructures are produced from unsupported catalytic metal powders. A dispersing agent, such as sodium chloride, is blended with the catalytic metal powders prior to milling to the desired catalytic size to prevent the powder particles from sintering.

24 Claims, No Drawings

METHOD FOR PRODUCING POWDERED METAL CATALYSTS

CROSS-REFERENCE TO RELATED APPLICATIONS

This is a divisional of U.S. Ser. No. 10/015,453 filed Dec. 11, 2001 now U.S. Pat. No. 6,849,245.

BACKGROUND OF THE INVENTION

1. Field of the Invention

This present invention relates to a method for producing high yields of high-purity carbon nanostructures having uniform average widths narrower than conventional carbon nanostructures. The nanostructures are produced from unsupported catalytic metal powders. A dispersing agent, such as sodium chloride, is blended with the catalytic metal powders prior to milling to the desired catalytic size to prevent the powder particles from sintering.

2. Description of Related Art

Nanostructure materials, particularly carbon nanostructure materials, are quickly gaining importance for various potential commercial applications. Such applications include their use to store hydrogen, to serve as catalyst supports, to be useful in various batteries, and as reinforcing components for polymeric composites. U.S. Pat. Nos. 5,149,584 and 5,618,875 to Baker et al. teach carbon nanofibers as reinforcing components in polymer reinforced composites. The carbon nanofibers can either be used as is, or as part of a structure comprised of carbon fibers having carbon nanofibers grown therefrom.

U.S. Pat. No. 5,413,866 to Baker et al. teaches carbon nanostructures characterized as having: (i) a surface area from about 50 $m^2/g$ to 800 $m^2/g$; (ii) an electrical resistivity from about 0.3 $\mu ohm \cdot m$ to 0.8 $\mu ohm \cdot m$; (iii) a crystallinity from about 5% to about 100%; (iv) a length from about 1 $\mu m$ to about 100 $\mu m$; and (v) a shape that is selected from the group consisting of branched, spiral, and helical. These carbon nanostructures are taught as being prepared by depositing a catalyst containing at least one Group IB metal and at least one other metal on a suitable refractory support, then subjecting the catalyst-treated support to a carbon-containing gas at a temperature from the decomposition temperature of the carbon-containing gas to the deactivation temperature of the catalyst.

U.S. Pat. No. 5,458,784 also to Baker et al. teaches the use of the carbon nanostructures of U.S. Pat. No. 5,413,866 for removing contaminants from aqueous and gaseous steams; and U.S. Pat. Nos. 5,653,951 and 6,159,538 to Rodriguez et al. disclose and claim methods of incorporating hydrogen into layered nanostructure materials characterized as having: (i) crystalline regions; (ii) interstices within the crystalline regions which interstices are from about 0.335 nm to 0.67 nm, and (iii) surfaces of said nanostructure which define the interstices, which surfaces have chemisorption properties with respect to hydrogen. All of the above referenced U.S. patents are incorporated herein by reference.

Carbon nanostructures, particularly carbon nanofibers, are typically produced by growing them from suitable supported or unsupported powdered metal catalysts at elevated temperatures, in the presence of hydrogen and an effective decomposing carbon-containing compound. Typically, the carbon-containing compound is selected from CO, methane, ethane, ethylene, acetylene, propane, propylene, butane, butene, butadiene, pentane, etc. While such a method is currently used to produce carbon nanostructures in substantial yields, the width of the nanostructures is difficult to control. Narrow width nanostructures are desirable. For example, the average width of a carbon nanostructure is dependent on the average size of the metal catalytic particle from which it was grown. This size typically ranges from about 25 to 450 nm.

One attempt to overcome this shortcoming of controlling carbon nanostructure width was to disperse catalytic metal particles over a suitable substrate, such as an amorphous carbon film, in order to produce carbon nanostructures having a more uniform narrower width. This was achieved to some degree since a more uniform catalyst particle size dispersion was achieved. Although the resulting carbon nanostructures resulting from such a method were found to have an average width about half that of those produced by more conventional techniques at that time, the yield of nanostructures was vastly reduced and unacceptable. In addition, the support material becomes an added impurity that should be avoided when such a method is used.

Thus, there is a need in the art for methods for producing high yields of carbon nanostructures, especially carbon nanofibers, having a substantially uniform narrow width.

SUMMARY OF THE INVENTION

In accordance with the present invention there is provided a method for producing powdered metal catalysts for use in the production of graphitic carbon nanostructures, which method comprises:

mixing: a) one or more metal compounds selected from the group consisting of metal carbonates, metal nitrates, and metal hydroxides, wherein at least one of the metals is a Groups VIII metal, with b) one or more dispersing agents characterized as: i) being substantially inert with respect to reaction with the carbon-containing gas at temperatures up to at least about 750° C.; (ii) being substantially inert with respect to chemical interaction with the catalytic metals at temperatures up to at least about 750° C.; (iii) not having a deleterious effect on the catalytic activity of the catalytic metals; and (iv) maintaining their physical integrity at temperatures up to at least about 750° C.;

calcining the resulting mixture at a temperature from about 200° C. to about 400° C. for an effective amount of time to convert the one or more metal components to their respective oxide;

milling the calcined mixture for an effective amount of time to decrease the particles comprising the mixture to a predetermined size;

chemically reducing the milled, calcined mixture of particles with hydrogen for an effective amount of time and temperature to reduce at least a portion of the catalytic metal oxides to the metallic state.

In a preferred embodiment the dispersing agent is selected from the group consisting of alkaline halides, alkaline-earth halides, and metal oxides.

In another preferred embodiment of the present invention the dispersing agent is removed from the product carbon nanostructure by use of a dilute acid.

In still another preferred embodiment the dispersing agent is added in the form of an alkaline halide to the calcined metal oxide mixture.

In yet another preferred embodiment of the present invention substantially all of the dispersing agent is removed from the product carbon nanostructures.

Also in accordance with the present invention there is provided a method for producing powdered metal catalysts for use in the production of graphitic carbon nanostructures, which method comprises:

calcining one or more metal compounds selected from the group consisting of metal carbonates, metal nitrates, and metal hydroxides, wherein at least one of the metals is a Groups VIII metal, at a temperature from about 200° C. to about 400° C. for an effective amount of time to convert the one or more metal components to their respective oxide;

adding an effective amount of dispersing agent to the calcined metal compound, which dispersing agent is characterized as: i) being substantially inert with respect to reaction with the carbon-containing gas at temperatures up to at least about 750° C.; (ii) being substantially inert with respect to chemical interaction with the catalytic metals at temperatures up to at least about 750° C.; (iii) not having a deleterious effect on the catalytic activity of the catalytic metals; and (iv) maintaining their physical integrity at temperatures up to at least about 750° C.;

milling the calcined metal compound and dispersing agent for an effective amount of time to decrease the particles comprising the mixture to a predetermined size;

chemically reducing the milled mixture of particles with hydrogen for an effective amount of time and temperature to reduce at least a portion of the catalytic metal oxides to the metallic state.

Also in accordance with the present invention a suitable carbon-containing compound having up to about 8 carbon atoms is decomposed in the presence of at least a portion of the reduced milled, calcined mixture of catalytic metal particles and dispersing agent at a temperature from about 450° C. to about 800° C.

DETAILED DESCRIPTION OF THE INVENTION

The propensity for carbon nanostructures to be formed during the interaction of carbon-containing compounds, such as hydrocarbons and carbon monoxide with hot metal surfaces is known. It has been recognized in recent years that a unique set of chemical and physical properties can be achieved if one controls the growth and structural characteristics of carbon nanostructures by the use of selected catalysts. The unusual properties exhibited by carbon nanostructured materials, coupled with the possibility of tailoring these properties as well as their dimension, have an impact on research activities associated with such carbon nanostructures. Of particular importance are carbon nanostructures having a relatively high-graphite content and narrow widths, since such nanostructures have a variety of potential commercial applications. Unfortunately, conventional methods for producing carbon nanostructures are not suitable for producing high yields of carbon nanostructures having relatively uniform narrow widths. The width of carbon nanostructures is typically dictated by the size of the catalytic metal particles from which they are grown, which is typically range from about 25 to 450 nm. Better control of, and narrower width nanostructures are highly desirable.

Non-limiting examples of preferred carbon nanostructures are multi-walled structures selected from carbon nanotubes, carbon nanoshells, carbon fibrils, and carbon nanofibers. Typically, it is desirable that the carbon nanostructure be graphitic, and in the case of carbon nanofibers, the most preferred carbon nanostructure, the interstices, or the distance between graphitic platelets, will be about 0.335 μm. It is to be understood that the terms "carbon filaments", "carbon whiskers", "carbon nanofibers", and "carbon fibrils", are sometimes used interchangeably by those having ordinary skill in the art. For purposes of the present invention, carbon fibrils, which themselves are sometimes referred to as carbon nanotubes, are of the type described in U.S. Pat. Nos. 4,663,230 and 5,165,909, both of which are incorporated herein by reference. Carbon fibrils are essentially cylindrical discrete structures characterized by a substantially constant diameter between about 3.5 nm and 70 nm, a length greater than about 102 times the diameter, an outer region of multiple essentially continuous layers of ordered carbon atoms, and a distinct inner core region. Each of the layers and core are reported in the above patents to be disposed substantially concentrically about the cylindrical axis of the fibril. Carbon nanotubes, other than those that are sometimes also referred to as carbon fibrils, will typically be of the fullerene type. Such structures are described in an article by M. S. Dresselhaus et. al. entitled *Fullerenes*, on pages 2087–2092; Journal of Materials Research, Vol 8, No.8, August 1993 and is incorporated herein by reference.

Carbon nanoshells, also sometimes referred to as carbon nanoparticles, are typically polyhedral-layered structures comprised of multiple layers of carbon, forming substantially closed shells around voids or metal particles of various shapes and sizes. For purposes of the present invention, a metal that is capable of dissociatively absorbing hydrogen, such as lanthanum and magnesium, is incorporated into the void, or hollow inner core of the carbon nanoshell.

The most preferred carbon nanostructure for purposes of the present invention are graphitic nanofibers. These carbon nanofibers are novel materials having a unique set of properties that include: (i) a surface area from about 20 to 3,000 $m^2/g$, preferably from about 50 to 800 $m^2/g$, more preferably from about 100 to 700 $m^2/g$, and most preferably from about 250 to 350 $m^2/g$, which surface area is determined by $N_2$ adsorption at −196° C.; (ii) a crystallinity from about 5% to about 100%, preferably from about 50% to 100%, more preferably from about 75% to 100%, most preferably from about 90% to 100%, and ideally substantially 100%; and (iii) interstices of about 0.335 nm to about 0.40 nm, preferably about 0.335 nm. The interstices are the distance between the graphite platelets. The shape of the nanofibers can be any suitable shape. Non-limiting examples of preferred shapes include straight, branched, twisted, spiral, helical, and coiled. The graphitic platelets can be oriented from substantially perpendicular to substantially parallel to the longitudinal, or growth, axis of the nanofiber. In the case where the graphitic platelets are oriented substantially perpendicular to the growth axis, the carbon nanofibers are sometimes referred to as "platelet". In the case where the graphitic platelets are oriented substantially parallel to the growth axis, the resulting nanofibers can be either "ribbon-like" or "multi-faceted tubular". The ribbon-like structures are composed of discontinuous, or non-linked platelets and be thought of as a series of sheets aligned substantially parallel to each other. The multifaceted tubular nanostructures have parallel graphite platelets linked at an angle different than 180°, preferably about 60° so that they form a non-cylindrical multifaceted tubular structure. Carbon nanoribbons, as well as other preferred carbon nanostructures of the present invention are those wherein at least about 5%, preferably at least about 50%, more preferably at least about 80%, and most preferably at least about 95% of the edge sites are exposed. Preferred carbon nanoribbon type materials are those wherein the platelets are continuous to form a non-cylindrical, but multi-faceted tubular structure, some-what like the structure of a multi-faced pencil. The graphitic platelets can also be oriented at an angle to the growth axis and thus are sometime referred to as "herringbone". Further, the surface area of the carbon nanofibers can be dramatically increased by careful activation with a suitable etching agent, such as carbon dioxide, steam, or the use of selected catalyst, such as an alkali or alkaline-earth metal.

The carbon nanostructures of the present invention are catalytically grown from unsupported metal powders. In this case, a carbon-containing compound is decomposed in the presence of the metal catalyst at temperatures from about 450° C. to about 800° C., more preferably from about 550° C. to about 700° C. It is also preferred that hydrogen be present during the decomposition of the carbon-containing compound.

Catalysts suitable for growing the carbon nanostructures of the present invention include both single metals, as well as alloys and multi-metallics. If the catalyst is a single metal then it will be a Group VIII metal selected from Fe, Ni, and Co. If the catalyst is an alloy or multimetallic material, then it is comprised of a first metal component that will be one or more Group VIII metals and a second metal that is preferably one or more Group IB metals, such as Cu, Ag, and Au. Preferred are Cu and Ag with Cu being the most preferred. If the catalyst is an alloy or multimetallic it is preferred that the catalyst be comprised of two Group VIII metals or one Group VIII metal and one Group IB metal. It will be understood that Zn can be used in place of one or more of the Group VIII metals. The Group IB metals is present in an amount ranging from about 0.5 to 99 at. % (atomic %). For example the catalyst can contain up to about 99 at. %, even up to about 70 at. %, or even up to about 50 at. %, preferably up to about 30 at. %, more preferably up to about 10 at. %, and most preferably up to about 5 wt. % copper, of Group IB metal with the remainder being a Group VIII metal, preferably nickel or iron, more preferably iron. Catalysts having a high copper content (70 at. % to 99 at. %) will typically generate nanofibers which are predominantly helical or coiled, and which have a relatively low crystallinity (from about 5 to 25%). Lower concentrations of copper, e.g., 0.5 to 30 at. % have a tendency to produce spiral and branched nanofibers, whereas a catalyst with about 30 to 70 at. %, preferably 30 to 50 at. % copper will produce predominantly branched nanofibers. A third metal can also be present. Although there is no limitation with respect to what the particular third metal can be, it is preferred that it be selected from the group consisting of Ti, W, Sn and Ta. When a third metal is present, it is substituted for up to about 20 at. %, preferably up to about 10 at. %, and more preferably up to about 5 at. %, of the second metal. It is preferred that the catalyst be comprised of Cu in combination with Fe, Ni, or Co. More preferred is Cu in combination with Fe and/or Ni from an economic point of view. A catalyst of which Fe is used in place of some of the Ni would be less expensive than a catalyst comprised of Cu in combination with only Ni.

Any suitable method can be used to produce the powdered metal catalyst. As previously mentioned, it is most preferred in the practice of the present invention that the carbon nanostructures be grown from unsupported metallic powders. A preferred method for preparing suitable unsupported metal catalytic powders is the use of colloidal techniques for precipitating them as metal oxides, hydroxides, carbonates, carboxylates, nitrates, etc. Such a process typically involves dissolving salts of each metal of the catalyst in an appropriate solvent, preferably water. A suitable precipitating agent, such as an ammonium carbonate, ammonium bicarbonate or ammonium hydroxide is added to the solution, thereby causing the metal to precipitate out as the corresponding metal carbonate or hydroxide. The precipitate is then dried at a temperature greater than about 100° C., preferably from about 105° C. to about 120° C., and more preferably at about 110° C. After drying, the precipitate is mixed with a suitable dispersing agent and calcined at a temperature from about 200° to 400° C., preferably from about 200° to about 300° C., thereby converting the individual metals to their respective oxide form. Alternatively, the dispersing agent can be incorporated after calcination. The mixed oxide forms, together with the dispersing agent, are then milled, preferably ball milled, under suitable conditions, to produce a dispersed metal powder catalyst of desired size for carbon nanostructure growth. The milled metal powder mixture is then heated, in a hydrogen-containing atmosphere, at a temperature from about 400° to about 600° C., preferably from about 450° to 550° C., for an effective amount of time, to produce the catalyst in its metallic state. The dispersing agent may also be reduced to its metallic state, depending on the dispersing agent. For example, if the dispersing agent is a metal oxide it can be reduced to its metallic state, whereas if the dispersing agent is a salt, such as sodium chloride, it will remain as is during treatment with a hydrogen atmosphere. By effective amount of time, we mean that amount of time needed to reduce substantially all of the metal oxides to the respective metal or alloy having a suitable particle size. A typical amount of time will generally be from about 15 to 25 hours. Suitable particle sizes are from about 2.5 nm to about 150 nm, preferably from about 2.5 nm to about 100 nm, and more preferably from about 2.5 nm to about 20 nm. Following this treatment the chemically reduced catalyst is cooled to about room temperature in a helium environment before being passivated in a 2% oxygen/helium mixture for 1 hour at about room temperature (24° C.).

Salts of the catalytic metal suitable for use in the present invention are salts that are soluble in both water, organic solvents, and diluted mineral acids. Non-limiting examples of water-soluble salts suitable for use herein include nitrates, sulfates and chlorides. Non-limiting examples of preferred salts soluble in organic solvents, which are suitable for use herein, include formates, acetates, and oxalates. Non-limiting examples of organic solvents that are suitable for use herein include alcohols, such as methanol, ethanol, propanol, and butanol; ketones, such as acetone; acetates and esters; and aromatics, such as benzene and toluene.

Dispersing agents suitable for use in the present invention are those that: (a) are substantially inert with respect to reaction with the carbon-containing gas at temperatures up to at least about 750° C.; (b) are substantially inert with respect to chemical interaction with the catalytic metals at temperatures up to at least about 750° C.; (c) do not have a deleterious effect on the catalytic activity of the catalytic metals; and (d) maintain their physical integrity at temperatures up to at least about 750° C. Dispersing agents are to be distinguished from supports. In a typical supported catalyst system, the amount of support is far greater than the amount of the metal component. That is, the weight of support versus catalytic metal on support is generally greater than about 50 wt. %, typically much greater than about 85 wt. %, based on the total weight of support plus catalytic metal. In contrast, the amount of dispersing agent used in the practice of the present invention will be substantially lower than the amount of metal. The amount of dispersing agent used in the practice of the present invention will be from about 1 wt. % to about 50 wt. %, preferably from about 5 wt. % to about 25 wt. %, and more preferably from about 5 wt. % to about 10 wt. %, based on the total weight of catalytic metal plus dispersing agent. It is preferred that only an effective amount of dispersing agent be used. That is, only that amount needed to prevent the particles of the powdered metal catalyst from sintering or agglomerating.

Preferred classes of compounds that can be used as dispersing agents in the practice of the present invention include alkaline and alkaline earth halides and metal oxides. Non-limiting examples of alkaline halides that can be used in the practice of the present invention include: sodium fluoride, sodium chloride, sodium bromide, potassium fluoride, potassium chloride, potassium bromide, lithium fluoride, and rubidium fluoride; preferred are sodium chloride and potassium chloride, and more preferred is sodium chloride. Non-limiting examples of alkaline earth halides that can be used in the practice of the present invention include calcium fluoride, calcium chloride, calcium bromide, magnesium fluoride, magnesium chloride, magnesium bromide, barium fluoride, barium chloride, barium bromide, strontium fluoride, strontium chloride and strontium bromide; preferred are calcium chloride and magnesium chloride, and more preferred is calcium chloride. Non-limiting examples of preferred metal oxides include magnesia, silica, alumina, titania, tungsten oxide, tantalum oxide, molybdenum oxide, lanthanum oxide, tellurium oxide, chromium oxide, niobium oxide and zirconium oxide. Preferred are magnesia, silica, and titania; and more preferred is silica.

As previously mentioned, one or more dispersing agents is mixed with one or more catalytic metal precursor compounds prior to, or following calcining. The catalytic metal precursor compound will most typically be a carbonate, nitrate, or hydroxide of the desired catalytic metal. The mixture is then calcined as previous mentioned at a temperature from about 200° C. to about 400° C. to produce the respective oxide forms of the catalytic metal. The calcining or course will be preformed in an oxidizing atmosphere, preferably in air. This mixture of oxides, catalytic metal oxides plus dispersant oxide, are then subjected to any suitable technique that will reduce their particle size. A preferred size reduction technique is milling, preferably ball milling, to the size desired for catalytic growth of carbon nanostructures. It is preferred that the milled particle size be from about 2.5 nm to about 150 nm, preferably from about 2.5 nm to about 100 nm, and more preferably from about 2.5 nm to about 20 nm. Typical milling times will be from about 24 hrs to about 72 hrs. The presence of the dispersing agent during milling keeps the metal powder particles from sintering, or agglomerating, during the milling process. The dispersing agent can be irreversibly oxidized, or present as a stable alkaline halide, and remains in that state within the metal granules following subsequent reduction, thus minimizing sintering of the metallic compounds of the catalyst. This enables the production of powder catalyst particles substantially smaller than those obtained by conventional techniques that do not employ the use of a dispersing agent.

In a more preferred embodiment, the dispersing agent is a solid that remains substantially stable in its initial chemical state when treated in the presence of either oxygen or hydrogen at temperatures up to at least about 750° C. In the most preferred embodiment, the dispersing agent is removed from the system after the catalyst has been used to grow carbon nanofibers. This step can be accomplished by treatment with water, dilute mineral acid or dilute alkali solution. In this way the dispersing agent is not present in the final solid carbon nanostructure product.

Carbon-containing compounds suitable for use in the practice of the present invention are compounds composed mainly of carbon atoms and hydrogen atoms, although carbon monoxide can also be used. The carbon-containing compound, which is typically introduced into the heating zone in gaseous form, will generally have no more than 8 carbon atoms, preferably no more than 6 carbon atoms, more preferably no more than 4 carbon atoms, and most preferably no more than 2 carbon atoms. Non-limiting examples of such compounds include CO, methane, ethane, ethylene, acetylene, propane, propylene, butane, butene, butadiene, pentane, pentene, cyclopentadiene, hexane, cyclohexane, benzene, toluene. Combinations of gases are preferred, particularly carbon monoxide and ethylene.

It may be desirable to have an effective amount of hydrogen present in the heating, or growth, zone during nanostructure growth. Hydrogen serves two complementary functions. For example, on the one hand it acts as a cleaning agent for the catalyst, and on the other hand it hydrogasifies, or causes carbon burn-off, of the carbon structure. By an effective amount, we mean that minimum amount of hydrogen that will maintain a clean catalyst surface (free of carbon residue), but not so much that will cause excessive hydrogasification, or burn-off, of carbon from the nanostructures and/or substrate structure, if present. Generally, the amount of hydrogen present will range from about 5 to 40 vol. %, preferably from about 10 to 30 vol. %, and more preferably from about 15 to 25 vol. %. For some catalyst systems, such as Cu:Fe, the hydrogasification reaction is relatively slow, thus, an effective amount of hydrogen is needed to clean the catalyst in order to keep it clean of carbon residue and maintain its activity. For other catalyst systems, such as Cu:Ni, where the activity is so high that excessive hydrogasification occurs, even at relatively low levels of hydrogen, little, if any, hydrogen is needed in the heating zone. A Cu:Ni catalyst is so active that it utilizes essentially all of the carbon deposited thereon to grow nanofibers, and thus, there is generally no carbon residue to clean off.

After the carbon nanostructures, preferably nanofibers, are grown, it may be desirable to treat the final structure with an aqueous solution of an inorganic acid, such as a mineral acid, to remove any excess catalyst particles. Non-limiting examples of mineral acids, which can be used, include sulfuric acid, nitric acid, and hydrochloric acid. Preferred is hydrochloric acid.

The edges of the graphite platelets may be etched with an appropriate etching agent, preferably carbon dioxide, steam, or a suitable catalyst such as an alkali or alkaline-earth metal.

The present invention will be illustrated in more detail with reference to the following examples, which should not be construed to be limiting in scope of the present invention.

EXAMPLE 1

In the first series of experiments various amounts of the silicon compound, tetraethyl-orthosilicate, were added to a mixture of iron and nickel carbonates and subsequently calcined at 400° C. for 4 hours in 100 mL/min air. The resulting mixed oxide powder was removed from the reactor, ball-milled for 60 hours, then reduced in a 10% $H_2$/He atmosphere for 20 hours at 500° C. Upon cooling to room temperature, the catalyst was passivated in a 2% air/He flow for one hour. Under these conditions, the iron and nickel components were reduced to the metallic state, but the silicon remained in the fully oxidized state.

These catalyst systems were used to synthesize graphite nanofibers from the interaction of a CO/$H_2$ (1:4) mixture at 670° C. The width distributions of the graphite nanofiber obtained from these experiments was obtained from measurements performed in a transmission electron microscope. The data shown in Table 1 below show the variation in average widths of graphite nanofibers grown from Fe—Ni (6:4)-CO/$H_2$ (1:4) at 670° C. for 3.0 hours as a function of the concentration of $SiO_2$ additive. Inspection of this data evidences that the narrowest graphite nanofibers are obtained with a catalyst containing 5 wt. % of $SiO_2$ additive.

TABLE 1

| % $SiO_2$ Additive in Fe—Ni (6:4) catalyst | Average GNF Width (nm) |
| --- | --- |
| 0 | 34.7 |
| 1 | 32.7 |
| 5 | 23.0 |
| 15 | 31.2 |

EXAMPLE 2

The procedure of Example 1 was followed except various amounts of sodium chloride were added to a Fe—Ni (6:4) catalyst and the resulting catalyst system used to grow graphite nanofibers from the interaction with a CO—$H_2$ (1:4) mixture at 670° C. The data presented in Table 2 below show the variation in average widths of graphite nanofibers grown from Fe—Ni (6:4)-CO/$H_2$ (1:4) at 670° C. for 4.0 hours as a function of the concentration of the NaCl additive. Inspection of this data shows that the narrowest graphite nanofibers are obtained from this system with a catalyst containing 5 to 10 wt. % of NaCl additive.

TABLE 2

| % NaCl Additive in Fe—Ni (6:4) Catalyst | Average GNF Width (nm) |
| --- | --- |
| 0 | 27.7 |
| 2.5 | 20.4 |
| 5.0 | 11.6 |
| 10.0 | 11.7 |
| 15.0 | 28.0 |

EXAMPLE 3

The procedure of Example 1 was followed except 5 wt. % sodium chloride was added to a Fe—Ni (6:4) catalyst and the resulting catalyst system was used to grow graphite nanofibers from the interaction with a CO—$H_2$ (1:4) mixture at various temperatures. The data given in Table 3 below shows the variation in average widths of graphite nanofibers grown from 5 wt. % NaCl Fe—Ni (6:4)-CO/$H_2$ (1:4) at temperatures ranging from 650 to 675° C. for 3.0 hours. It is evident that for this catalyst composition the narrowest graphite nanofibers are obtained at temperatures between 665 and 675° C.

TABLE 3

| Temperature (° C.) | Average GNF Width (nm) |
| --- | --- |
| 650 | 53.9 |
| 660 | 28.7 |
| 665 | 18.0 |
| 670 | 16.5 |
| 675 | 17.3 |

EXAMPLE 4

The procedure of Example 1 was followed except 5 wt. % sodium chloride was added to a Fe—Ni (6:4) catalyst and the resulting catalyst system was used to grow graphite nanofibers from the interaction with a CO—$H_2$ (1:4) mixture at 670° C. for various periods of time. The data presented in Table 4 below shows the variation in average width and the amounts of nanofibers formed as a function of reaction time.

TABLE 4

| Time (hours) | Average GNF Width (nm) | Grams GNF/Grams Metal |
| --- | --- | --- |
| 3 | 16.5 | 11.32 |
| 4 | 11.6 | 14.02 |
| 5 | 11.6 | 20.89 |
| 12 | 16.2 | 28.79 |

EXAMPLE 5

During the interaction of Fe—Ni (6:4) with CO/$H_2$ (1:4) at 660 to 675° C. in the addition to the growth of graphite nanofibers there is also a significant fraction of an undesirable "shell" type material formed. The procedure of Example 1 was followed except catalyst powders containing 2.5 to 15 wt. % NaCl were used and the effect of certain post-reaction treatments on the formation of the "shell" type deposits resulting from the Fe—Ni (6:4) catalytic decomposition of CO/$H_2$ (1:4) at 670° C. for 5 hours was examined. From the data presented in Table 5 below it is evident that one can reduce the fraction of this undesirable component in all catalysts containing NaCl by continuing to heat the sample in a $H_2$/He (4:1) mixture at 670° C. for 1.0 hours after the CO has been switched off and then cooling in He to room temperature.

TABLE 5

| Additive | Post-treatment | % "shells" (>78 nm) |
| --- | --- | --- |
| None | None | 16.83 |
| 2.5% NaCl | $H_2$/He (4:1) at 670° C. for 1.0 hr | 4.30 |
| 5% NaCl | $H_2$/He (4:1) at 670° C. for 1.0 hr | 3.96 |
| 10% NaCl | $H_2$/He (4:1) at 670° C. for 1.0 hr | 2.44 |
| 10% NaCl | $H_2$/He (4:1) at 670° C. for 1.0 hr | 0.02 |
| 15% NaCl | $H_2$/He (4:1) at 670° C. for 1.0 hr | 3.33 |

EXAMPLE 6

The procedure of Example 1 was followed except catalyst powders containing 2.5 to 15 wt. % NaCl were used and the effect of certain post-reaction treatments on the growth characteristics of graphite nanofibers produced from the Fe—Ni (6:4) catalytic decomposition of CO/$H_2$ (1:4) at 670° C. for 5 hours was examined. The data presented in Table 6 below shows the variation in average width and the amounts of nanofibers formed as a function of the amount of added NaCl in the catalyst preparation. Inspection of these results indicates that once again the narrowest width is obtained from catalyst formulations containing 5 to 10 wt. % NaCl.

TABLE 6

| Additive | Post-treatment | Average GNF Width (nm) |
|---|---|---|
| 2.5% NaCl | H$_2$/He (4:1) at 670° C. for 1.0 hr | 14.0 |
| 5% NaCl | H$_2$/He (4:1) at 670° C. for 1.0 hr | 11.6 |
| 10% NaCl | H$_2$/He (4:1) at 670° C. for 1.0 hr | 9.4 |
| 10% NaCl | H$_2$/He (4:1) at 670° C. for 1.0 hr | 9.8 |
| 15% NaCl | H$_2$/He (4:1) at 670° C. for 1.0 hr | 16.0 |

The invention claimed is:

1. A method for producing powdered metal catalyst for use in the production of carbon nanostructures, which method comprises:
mixing a) a Group VIII metal compound selected from carbonates, metal nitrates, and metal hydroxides, wherein the Group VIII metal is selected from Fe, Ni and Co, with b) one or more dispersing agents characterized as: i) being substantially inert with respect to reaction with the carbon-containing gas at temperatures up to at least about 750° C.; (ii) being substantially inert with respect to chemical interaction with the catalytic metals at temperatures up to at least about 750° C.; (iii) not having a deleterious effect on the catalytic activity of the catalytic metals; and (iv) capable of maintaining their physical integrity at temperatures up to at least about 750° C., wherein the amount or dispersing agent is from about 5 wt. % to about 25 wt. % based on the total weight of metal compounds and dispersing agents;
calcining the resulting mixture at a temperature from about 200° C. to about 400° C. for an effective amount of time to convert at least the metal compound to its respective oxide;
milling the calcined mixture for an effective amount of time to decrease the particles comprising the mixture to a predetermined size;
treating the milled, calcined mixture of particles with hydrogen for an effective amount of time and temperature to chemically reduce at least a portion of the catalytic metal oxides to the metallic state.

2. The method of claim 1 wherein the amount of dispersing agent used is from about 5 to about 10 wt. %.

3. The method of claim 1 wherein the dispersing agent is selected from the group consisting of alkaline halides, alkaline-earth halides, and metal oxides.

4. The method of claim 3 wherein the dispersing agent is an alkaline halide selected from the group consisting of sodium fluoride, sodium chloride, sodium bromide, potassium fluoride, potassium chloride, potassium bromide, lithium fluoride, and rubidium fluoride.

5. The method of claim 4 wherein the dispersing agent is sodium chloride.

6. The method of claim 3 wherein the dispersing agent is an alkaline-earth halide selected from the group consisting of calcium fluoride, calcium chloride, calcium bromide, magnesium fluoride, magnesium chloride, magnesium bromide, barium fluoride, barium chloride, barium bromide, strontium fluoride, strontium chloride and strontium bromide; preferred are calcium chloride and magnesium chloride, and more preferred is calcium chloride.

7. The method of claim 3 wherein the dispersing agent is a metal oxide selected from the group consisting of magnesia, silica, alumina, titania, tungsten oxide, tantalum oxide, molybdenum oxide, lanthanum oxide, tellurium oxide, chromium oxide, niobium oxide and zirconium oxide.

8. The method of claim 1 wherein the predetermined size is about 2.5 nm to about 100 nm.

9. The method of claim 1 wherein the catalytic metal is a bimetallic comprised of iron and nickel.

10. The method of claim 1 wherein at least one additional metal compound is present to produce a multimetallic catalyst, which at least one additional metal compound is of a metal selected from the Group VIII metals Fe, Ni and Co and Group IB metals.

11. The method of claim 10 wherein the catalytic metal is a bimetallic comprised of iron and copper.

12. A method for producing powdered metal catalyst for use in the production of carbon nanostructures, which method comprises:
calcining a Group VIII metal compound selected from carbonates, metal nitrates, and metal hydroxides, wherein the Group VIII metal is selected from Fe, Ni and Co at a temperature from about 200° C. to about 400° C. for an effective amount of time to convert at least the metal compound to its respective oxide;
adding an effective amount of dispersing agent to the calcined metal compound, which dispersing agent is characterized as: i) being substantially inert with respect to reaction with the carbon-containing gas at temperatures up to at least about 750° C.; (ii) being substantially inert with respect to chemical interaction with, the catalytic metals at temperatures up to at least about 750° C.; (iii) not having a deleterious effect on the catalytic activity of the catalytic metals; and (iv) maintaining their physical integrity at temperatures up to at least about 750° C., wherein the amount of dispersing agent is from about 5 wt. % to about 25 wt. % based op the total weight of metal compounds and dispersing agent;
milling the calcined metal compound and dispersing agent for an effective amount of time to decrease the particles comprising the mixture to a predetermined size;
chemically reducing the milled mixture of particles with hydrogen for an effective amount of time and temperature to reduce at least a portion of the catalytic metal oxides to the metallic state.

13. The method of claim 12 wherein the amount of dispersing agent used is from about 5 to about 10 wt. %.

14. The method of claim 12 wherein the dispersing agent is selected from the group consisting of alkaline halides, alkaline-earth halides, and metal oxides.

15. The method of claim 14 wherein the dispersing agent is an alkaline halide selected from the group consisting of sodium fluoride, sodium chloride, sodium bromide, potassium fluoride, potassium chloride, potassium bromide, lithium fluoride, and rubidium fluoride.

16. The method of claim 15 wherein the dispersing agent is sodium chloride.

17. The method of claim 14 wherein the dispersing agent is an alkaline-earth halide selected from the group consisting of calcium fluoride, calcium chloride, calcium bromide, magnesium fluoride, magnesium chloride, magnesium bromide, barium fluoride, barium chloride, barium bromide, strontium fluoride, strontium chloride and strontium bromide; preferred are calcium chloride and magnesium chloride, and more preferred is calcium chloride.

18. The method of claim 14 wherein the dispersing agent is a metal oxide selected from the group consisting of magnesia, silica, alumina, titania, tungsten oxide, tantalum oxide, molybdenum oxide, lanthanum oxide, tellurium oxide, chromium oxide, niobium oxide and zirconium oxide.

19. The method of claim 12 wherein the predetermined size is about 2.5 nm to about 100 nm.

20. The method of claim 12 wherein the catalytic metal is a bimetallic comprised of iron and nickel.

21. The method of claim 12 wherein at least one additional metal compound is present to produce a multimetallic catalyst, which at least one additional metal compound is of a metal selected from the Group VIII metals Fe, Ni and Co and Group IB metals.

22. The method of claim 12 wherein the catalytic metal is a bimetallic comprised of iron and nickel.

23. The method of claim 3 wherein at least one additional metal compound is present to produce a multimetallic catalyst, which at least one additional metal compound is of a metal selected from the Group VIII metals Fe, Ni and Co and Group IB metals.

24. The method claim 14 wherein at least one additional metal compound is present to produce a multimetallic catalyst, which at least one additional metal compound is of a metal selected from the Group VIII metals Fe, Ni and Co and Group IB metals.

\* \* \* \* \*